INVENTORS
Ralph J. Jacob
Duane E. Deming
ATTORNEYS

INVENTORS
Ralph J. Jacob
Duane E. Deming
BY McCoy, Greene & Ordenbuis
ATTORNEYS

Dec. 18, 1962 R. J. JACOB ET AL 3,068,926
PNEUMATIC CORD TIRE CONSTRUCTION
Filed Oct. 4, 1960 3 Sheets-Sheet 3

INVENTORS
Ralph J. Jacob
Duane E. Deming
BY McCoy, Greene & TeGrotenhuis
ATTORNEYS United States Patent Office 3,068,926
Patented Dec. 18, 1962

3,068,926
PNEUMATIC CORD TIRE CONSTRUCTION
Ralph J. Jacob, Akron, Ohio, and Duane E. Deming, Fair Oaks, Calif., assignors to The General Tire & Rubber Company, Akron, Ohio, a corporation of Ohio
Filed Oct. 4, 1960, Ser. No. 60,496
14 Claims. (Cl. 152—354)

This invention relates generally to a pneumatic cord tire construction and particularly to a tire structure designed to effectively resist shocks of impact and to withstand the deteriorating effects of the forced vibrations set up in the crown, side wall and bead portions of such tires when operated at high speeds.

The tire of the present invention is provided with a crown portion that is transversely convex and that has its cord reinforcement so arranged that it provides a mid-circumferential zone of greater flexibility than the portions lying between said zone and the side edges of the crown portion, said more flexible zone being yieldable under compression to provide a wide ground engaging area and a uniform distribution of pressure throughout that area so that wear on the tread surface is substantially uniform throughout a relatively wide circumferential central zone and deformations due to load and impact stresses are more widely distributed.

The tire reinforcement is also so arranged that abrupt changes in flexibility in adjoining portions of the side wall and crown portions of the tire and the side wall and bead portions of the tire are avoided so that severe localized bending stresses and excessive heating due to such stresses are avoided.

The advantageous results referred to are obtained in the tire of the present invention by providing the tire with one or more cord fabric bands that have cords extending from bead to bead, that have opposite edge portions that are wrapped about bead rings in the bead portions of the tire and that extend back through the side wall into the crown portion of the tire exteriorly of the body of the band. This band, which may be formed of a plurality of plies of cord fabric, is of a width such that the turned back edge portions thereof terminate short of the center plane of the tire, providing double reinforcement in the tire side walls and in opposite side portions of the tire crown, but leaving a narrow gap between the band edges which provides a mid-circumferential zone in the tire crown which is of greater flexibility than the portions thereof on opposite sides of said zone.

In order to provide the necessary stretch resistance, a plurality of cord fabric breaker bands are provided which bridge the gap between the edges of the carcass band. The innermost breaker band is preferably of a width to extend the full width of the crown portion of the tire and underlies the turned back portion of the carcass band. A second breaker strip overlies the turned back edges of the carcass band and is of a width less than the width of the inner breaker band so that a gradual change in flexibility is provided at the juncture of the side wall and crown portions of the tire.

By reason of the fact that the edges of the carcass band are located in the crown portion of the tire instead of in the bead portion, the juncture of the side wall portions with the bead portions can be made to have a less abrupt change in flexibility so that heating of the bead portions due to cyclically imposed bending stresses is considerably reduced.

For heavy duty tires, two or more inextensible bead rings may be provided in each bead portion of the tire and a carcass band similar to the first may be turned back over and enclose each such additional ring. The outer carcass bands are preferably somewhat narrower than the innermost carcass band so as to provide a wider gap between their edges in the crown portion of the tire, so as to avoid abrupt changes in flexibility between the central and side portions of the tire crown. Additional breaker bands are provided with each additional carcass band and the breaker bands are progressively narrower to provide edges stepped inwardly from the tire shoulders.

An important feature of the present invention is the provision of more flexible bead portions which provide a less abrupt change in flexibility at the juncture of the side wall and bead portions. In conventional tire constructions numerous fabric edges terminate in the bead portions outwardly of the bead edges and impart stiffness to the bead portions at their juncture with the side walls. The present invention provides a structure which permits all cyclically imposed deformations of the side walls to be distributed throughout a greater area of the side walls so that the heating and fatiguing effects due to localized bending stresses are greatly lessened.

The cord reinforcement in the central zone of the tire crown is so disposed that the elastic rubber in said zone provides resilience or springiness both circumferentially and transversely of the crown portion of the tire, together with stiffness sufficient to restrict to small amplitude the cyclically imposed deformations and to provide a natural rate of vibration circumferentially and laterally much higher than any which may be cyclically imposed thereon by rolling at high speed on a supporting surface, so that forced vibrations are effectively damped and increase in the amplitude of such vibrations due to an approach to the resonant frequency is avoided.

In tires of conventional construction which are internally round in transverse section, it is necessary in order to obtain effective traction and to distribute the wear on the tread surface, to provide an elastic rubber tread of considerable thickness and of an external curvature much less than that of the underlying tire carcass, so that the yieldability of the rubber, together with the low transverse external curvature of the tread, will permit enough flattening of the tread to provide a ground contact area of sufficient width to provide effective traction. Such treads are heavy and have a radial depth at the tread shoulders which is much in excess of that at the center of the tread and when the tire is operated at high speeds of rotation the treads are subjected to a centrifugal force tending to expand the same radially and tear the tread away from the tire carcass, the centrifugal force being greatest at the heavy shoulder portions of the tread, and the destructive effect of the centrifugal force being aggravated by the traction wave which creates severe localized distortion at the trailing edge of the ground engaging area.

In the tire of the present invention centrifugal force acting upon the tread is relatively small because the tread is relatively thin and of substantially uniform depth throughout its width. The present invention can be advantageously applied to tires of normally transversely round form, since the greater flexibility of the crown portion of the tire carcass under radially imposed loads provides more uniform distribution of the imposed load over a wider ground engaging area with the result that the tread wear is more uniform, making it possible to provide a tread of considerably less weight. The advantages of the present invention are, however, obtained to a greater degree when the tire is vulcanized to a form in which the crown portion is of considerably less transverse curvature than the side wall portions and that is reinforced to resist expansion under inflation pressure, since such a structure provides a wider ground contact area and a more uniform distribution of pressure over the ground engaging area with less radial deflection of the crown portion of the tire carcass.

Novel and advantageous features of the present invention may be summarized as follows:

The tire construction of the present invention provides a wide ground engaging tread zone through which the load is uniformly distributed so as to provide more uniform tread wear.

The present invention provides a tire carcass construction in which there is a zone of greater flexibility centrally of the crown portion of the tire, which makes practical the use of a relatively thin tread of uniform thickness which results in less severe flexing action under the cyclically imposed stresses and impact shocks and reduces the heating effects due to such flexing, and distributes the heating effects more uniformly throughout the tire, which provides improved fatigue resistance and which provides the crown portion of the tire carcass with both circumferential and lateral resilience, providing spring action both circumferentially and laterally that limits the amplitude of the lateral and circumferential deformations that are imposed cyclically upon rotation at high speed on a ground surface, the resilient crown having a high spring rate both laterally and circumferentially which effectively damps the forced lateral and circumferential vibrations.

Reference should be had to the accompanying drawings forming part of this specification, in which.

Figure 1:
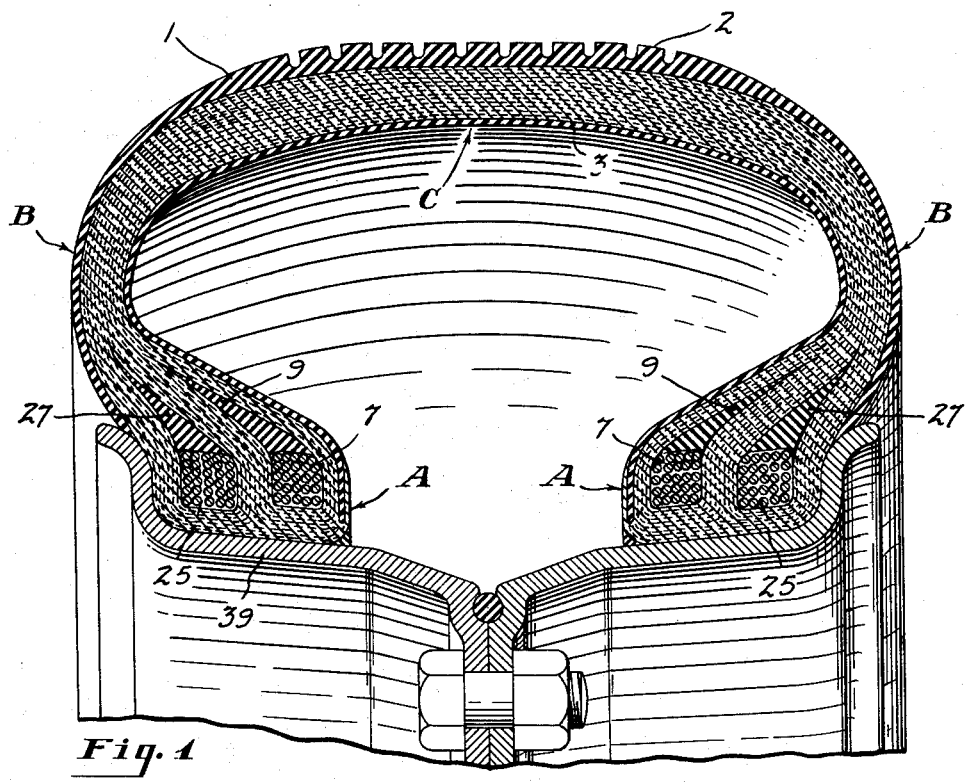
FIGURE 1 is a transverse section through a tire embodying the invention.

In the accompanying drawings the invention is shown applied to a tire of materially less height than width and having a crown portion of slight transverse curvature, the tire having bead portions A, side wall portions B and a crown portion C which are reinforced with a cord fabric.

The tire has an external covering 1 of rubber which includes a tread portion 2 of substantially uniform thickness. The tire is provided with an interior layer of rubber 3 which covers the interior of an inner carcass band 4 which, as shown herein, is made up of inner and outer plies of bias cut cord fabric 5 and 6. The plies 5 and 6 have cords extending diagonally in crossing relation and the band is of a width approximately twice the perimetric width of the interior of the tire. An inextensible bead ring 7 is applied to the exterior of the band 4 on opposite sides of the form upon which the tire is built and the band is wrapped around each of the rings 7 and back upon itself in the side walls B and the opposite edges of the band terminate in the crown portion C of the tire. The bead ring 7 is enclosed in a flipper strip 8, the free edges of which extend radially outwardly from the bead ring, one edge portion being adhered to the exterior of the ply 6. The flipper strip 8 encloses an outwardly tapering filler strip 9 of rubber outwardly of the bead ring 7. The ply 6 has a turned back portion 10 that is stitched to the flipper strip 8 and to the exterior of the ply 6 in the side wall and the ply 5 has a turned back portion 11 that is stitched to the exterior of the turned back portion 10. The ply 6 is somewhat wider than the ply 5 so that the edge 12 thereof is closer to the center plane of the tire than the edge 13 of the turned back portion 11 of the ply 5. The edges 12 are closely adjacent the center plane of the tire and the two edges 12 and 13 are stepped to avoid an abrupt change in flexibility transversely of the crown portion of the tire. A breaker band 14 in the form of a bias cut cord fabric strip which extends throughout the tire circumference and substantially the full width of the crown portion C of the tire, is stitched to the exterior of the outer ply 6 of the carcass band, the edge portions of the breaker band 14 lying within the turned back portions 10 and 11 of the plies 5 and 6. A thin rubber layer 15 is applied to the exterior surface of the breaker band 14. A rubber strip 16 fills the gap between the spaced edges of the carcass band 4 and a thin layer of rubber 17 is applied to the exterior of the band 4. A second breaker band 18 narrower than the band 14 is applied exteriorly to the rubber layer 17 and a second carcass band composed of two plies 19 and 20 of bias cut cord fabric disposed with their cords in crossing relation extend from one bead portion C of the tire to the other and terminate within the bead ring 7. The central portion of the tire crown between the spaced edges 12 and 13 of the plies of the inner carcass band 4 is reinforced by the cords of carcass plies 5, 6, 19 and 20 and the cords of breaker plies 12 and 13, whereas the portions of the crown at opposite sides of said central zone are reinforced additionally by the cords of the turned back portions 10 and 11 of the carcass plies, so that the crown portion of the tire has a narrow circumferential zone that has greater flexibility than the portions of the crown on opposite sides thereof. By reason of the greater flexibility of this central zone in the crown portion of the tire carcass, less pressure in the ground engaging portion of the tire is required to flatten the crown portion of the carcass and the pressure is distributed uniformly over a ground engaging area of greater width.

Figure 2:
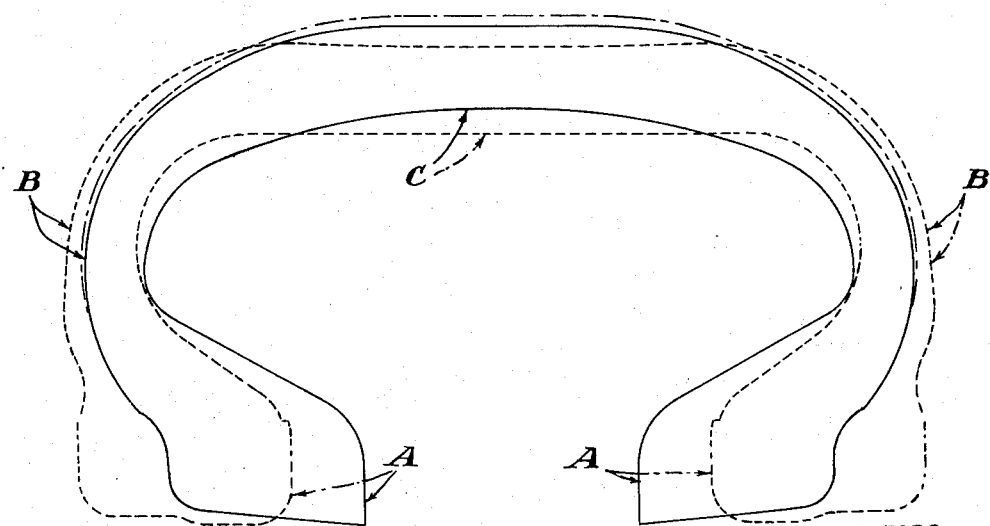
FIG. 2 is a diagrammatic view showing in dotted lines the shape to which the tire is built, in full lines the shape to which it is vulcanized, and in dash-dot lines the shape when inflated.
Figure 3:
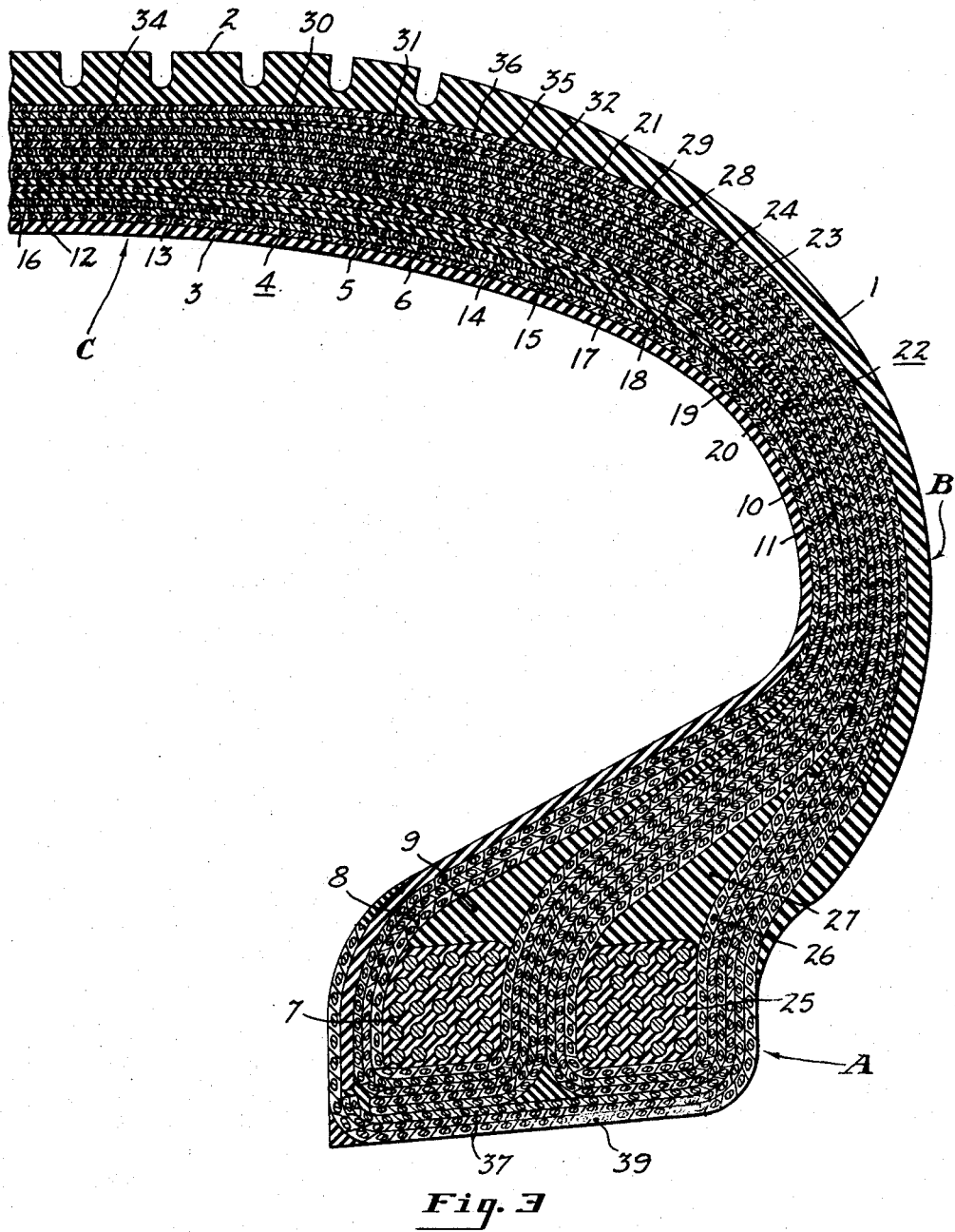
FIG. 3 is a transverse section through the tire on an enlarged scale, showing one-half of the tire.
Figure 4:
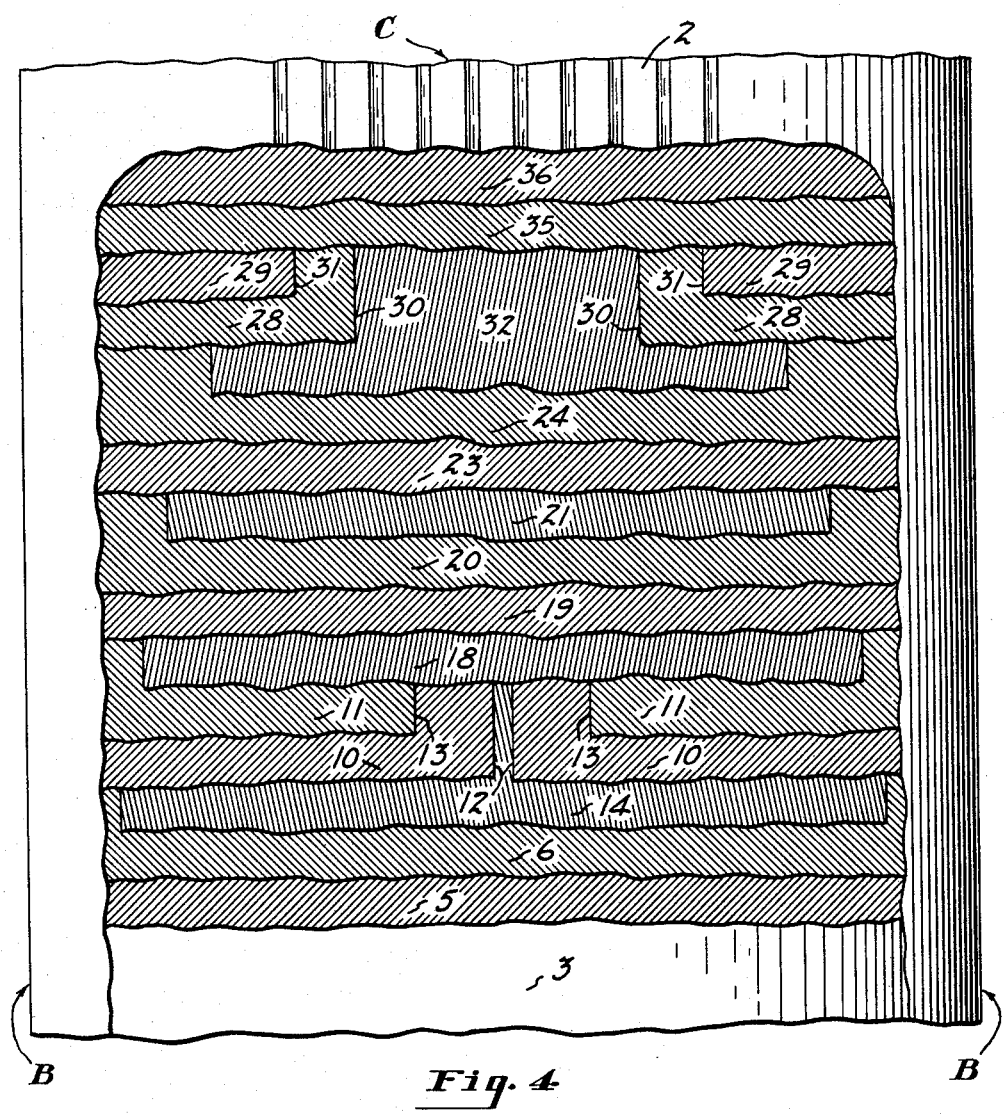
FIG. 4 is a plan view showing the arrangement of the carcass and breaker bands in a crown portion of the tire.

The tire is built upon a sectional form which has an exterior face which is of a perimetric width corresponding to the perimetric width of the interior of the finished tire and which approximately conforms to the interior of the finished tire, the shape of this face being shown in dotted lines in FIG. 2 of the drawings. The tire is preferably of a radial depth considerably less than its width and its crown portion is of a transverse curvature much less than the side wall portions. The fabric of the carcass bands is bias cut to dispose the cords at angles from 35° to 50° to the median plane of the tire while the fabric of the breaker bands is bias cut to provide cords extending at a much smaller angle to the center plane of the tire, the bias angle of the breaker bands being preferably from 10° to 25° so as to increase the resistance of the crown portion of the tire to regular expansion under inflation pressure, enough angularity being provided to permit sufficient radial expansion of the tire to fill the cavity of the vulcanizing mold and a sufficient number of breaker plies being provided to permit only a slight radial expansion under inflation pressure. As shown in FIG. 2, the shape to which the tire is built is shown in dotted lines, the molded shape of the tire is indicated in full lines and the shape of the inflated tire is indicated in dash-dot lines. In building the tire on the form the inner layer 3 of rubber is first applied to the form after which the two strips of bias cut fabric forming the carcass band 4 are shaped against and stitched to the rubber layer 4. The plies 5 and 6 may be applied successively or simultaneously and, after the breaker band 14 and rubber layer 15 have been applied, the edge portions 10 and 11 of the plies 6 and 5 are folded back over the bead ring 7 and against the ply 6 in the side wall and over the ply 14 in the crown portion of the tire. The edge portions 10 and 11 of the plies 6 and 5 may be folded back to the underlying portion of the tire carcass either successively or simultaneously. Breaker band 21 and carcass plies 23 and 24 are then applied in the conventional manner.

For a relatively light tire each bead portion may be provided with a single, inextensible bead ring, in which case the covering 1 of rubber and the tread 2 would be applied to the exterior of the outer ply 20 of the second carcass band. For a heavier duty tire such as required for the small diameter wing housed landing wheels of certain types of high speed aircraft a third breaker band 21, narrower than the band 18 is applied to the exterior of the ply 20 and a third carcass band 22 which is slightly narrower than the inner carcass band is applied exteriorly of the breaker strip 21 and to the exterior of the ply 20 in the side wall of the tire. The carcass band 22 is composed of inner and outer plies 23 and 24 and is wrapped around outer bead rings 25 which are enclosed in flipper strips 26 that are adhered to the outer ply 24 of said band. The flipper strip 26 encloses an outwardly tapered filler strip 27 of rubber outwardly of the inextensible bead ring 25 and the edge portion of the band 22 projecting past the ring 25 is folded back and stitched to the exterior of the strip 26 and to the exterior of the ply 24 in the side wall and terminates in the crown portion of the tire at a distance from the center plane of the tire greater than the distance between said center plane and the edges of the inner band 4. The outer ply 24 of the carcass band 22 is wider than the inner ply 23 so that the edges 30 and 31 of the turned back portions 28 and 29 of the plies 24 and 23 are stepped to avoid abrupt changes in flexibility in the crown portion of the tire.

A fourth breaker strip 32 is applied to the outer ply 24 of the carcass band 22 and this breaker band is narrower than the third breaker band 21 and underlies the turned back edge portions 28 and 29 of the plies 23 and 24 of the band 22. Two plies 35 and 36 are applied exteriorly of the carcass band 22 and these plies have edge portions 37 extending across the face of the bead portion A inwardly of the rings 7 and 25. A chafer strip 39 may be provided exteriorly of the portion 37 of the outer carcass band.

By reason of the fewer reinforcing plies of cord fabric in the central portion of the crown portion of the tire carcass, more elastic rubber is provided in the central portion, and this additional rubber serves to provide not only flexibility which enables the crown portion of the tire carcass to conform to the ground surface with which the tire is engaged, but also provides the said crown portion with resilience both laterally and circumferentially. By reason of their low angle to the center plane of the tire the breaker cords offer much greater resistance to circumferential tension than to lateral tension, whereas the cords of the carcass plies offer more resistance than the breaker cords to lateral stretch and less resistance to circumferential stretch.

Since the tires on small diameter wheels which may be subjected to heavy loads while rolling on a runway at above 250 miles per hour are subjected to cyclic deformations in the tread and side walls of very high frequency, the limiting of the amplitude of such deformations and the prevention of resonance is a problem of major significance. The present invention provides a tire construction in which resilience is provided both laterally and circumferentially in the crown portion of the tire carcass to provide damping action, and in which the stiffness both circumferentially and laterally serves to limit the amplitude of the cyclic distortions and to provide spring rates high enough for effective damping of the forced vibrations.

The provision of a tire structure of a character such that it is able to withstand the destructive effect of centrifugal force acting upon the rubber tread is also essential in tires required to operate at high speeds of revolution. The tire of the present invention, by providing a carcass structure more readily conformable to the ground surface upon which it rolls, provides a tread of uniform thickness with a wide ground engaging zone over which wear is uniformly distributed and makes practical the use of a thin light weight tread so that the centrifugal force is greatly reduced and the harmful effect of the action of centrifugal force on the crown portion of the tire carcass is also greatly reduced by reason of the fact that all breaker bands are located between bead to bead carcass plies.

In heavy duty tires operating at high speeds the deterioration of the bead portions of the tire due to cyclically imposed bending and compression stresses has been a serious problem. The tire of the present invention, by placing edges of the bead ring enclosing carcass plies in the crown portion of the tire instead of the bead portions, makes possible the provision of bead portions which are quite flexible radially outwardly of the bead rings, so that change in flexibility at the juncture of the side wall and bead portions of the tire is less abrupt and the cyclically imposed deformations of the side wall are distributed more uniformly and over a greater area so that the heating and fatiguing effects of such flexing is greatly reduced.

It is to be understood that in accordance with the provisions of the patent statutes, variations and modifications of the specific devices herein shown and described may be made without departing from the spirit of the invention.

What we claim is:

1. A pneumatic tire having bead portions with inextensible bead rings and side wall and crown portions reinforced by cord fabric disposed in superposed layers which include a cord fabric carcass band having a body portion with parallel cords extending throughout the side wall and crown portions of the tire from bead to bead and side edge portions, each folded back about a bead ring in a bead portion, overlying said body portion, extending through a side wall portion and into the crown portion of the tire and terminating short of the center plane of the tire to provide a narrow gap between its edges, and cord fabric breaker bands in said crown portion, the innermost of said breaker bands overlying the body portion of said band and extending substantially the full width of said crown portion with a major portion thereof underlying said turned back edge portions of said carcass band, and a second breaker band overlying said turned back edge portions and bridging said gap.

2. A pneumatic tire having bead portions with inextensible bead rings and side wall and crown portions reinforced by cord fabric disposed in superposed layers which include a cord fabric carcass band having a body portion with parallel cords extending throughout the side wall and crown portions of the tire from bead to bead and side edge portions, each folded back about a bead ring in a bead portion, extending through a side wall portion and into the crown portion of the tire and terminating short of the center plane of the tire to provide a narrow gap between its edges, additional cord fabric carcass bands extending throughout the side wall and crown portion of the tire exteriorly of said first mentioned carcass band, and a series of breaker bands in the crown portion of the tire which are of progressively less width from the innermost breaker band to the outermost, all of said breaker bands bridging the gap between the edges of said first carcass band, and all of said breaker bands having their side edges lying within portions of said carcass bands.

3. A pneumatic tire having bead portions with inextensible bead rings and side wall and crown portions reinforced with superposed carcass bands of cord fabric, each of said bands having a body portion with parallel cords extending from bead to bead at an angle of from 35° to 50° to the median plane of the tire and side edge portions folded back over said bead rings, overlying its body portion, extending through said side wall portions and into said crown portion and terminating short of the center plane of the tire to provide a gap between its edges, a narrow gap being provided between the edges of the innermost band and the gap between the band edges being increased outwardly of said innermost band, and cord fabric breaker bands in said crown portion that bridge said gaps and that have edge portions interposed between the body portions and folded back edge portions of said carcass band.

4. A pneumatic tire having bead portions with inextensible bead rings and side wall and crown portions reinforced with superposed carcass bands of cord fabric, each of said bands having a body portion with parallel cords extending from bead to bead and side edge portions folded back over said bead rings, overlying its body portion, extending through said side wall portions and into said crown portion and terminating short of the center plane of the tire to provide a gap between its edges, a narrow gap being provided between the edges of the innermost band and the gap between the band edges being increased outwardly of said innermost band, and a cord fabric breaker band bridging the gap between the edges of each of said carcass bands and interposed between the body portion and turned back edge portions thereof.

5. A pneumatic tire having bead portions with inextensible bead rings and side wall and crown portions reinforced with superposed carcass bands of cord fabric, each of said bands having a body portion with parallel cords extending from bead to bead at an angle of from 35° to 50° to the median plane of the tire and side edge portions folded back over said bead rings, overlying its body portion, extending through said side wall portions and into said crown portion and terminating short of the center plane of the tire to provide a gap between its edges, a narrow gap being provided between the edges of the innermost band and the gap between the band edges being increased outwardly of said innermost band, layers of rubber filling the gaps between the edges of said bands, and cord fabric breaker bands bridging said gaps and having edge portions interposed between the body portions and folded back edge portions of said carcass bands.

6. A pneumatic tire having bead portions with inextensible bead rings and side wall and crown portions reinforced with superposed carcass bands of cord fabric, said bands having body portions with parallel cords extending from bead to bead and side edge portions folded back over said bead rings, extending through said side wall portion and into said crown portion and terminating short of the center plane of the tire to provide gaps between the edges of said bands, a narrow gap being provided between the edges of the innermost band and the gap between the band edges being increased outwardly of said innermost band, layers of rubber filling the gaps between the edges of said bands, and a series of cord fabric breaker bands bridging said gaps, said breaker bands being disposed between the edge portions of the outermost of the carcass bands and the body portion of the innermost band, the innermost breaker band extending substantially the full width of said crown portion and the breaker band outwardly of said innermost band being progressively narrower.

7. A pneumatic tire having bead, side wall and crown portions that are of externally convex curvature and that are reinforced with superposed carcass bands of cord fabric, each bead portion having laterally spaced inextensible bead rings, each of said bands having parallel cords extending from bead to bead and side edge portions folded back over one of said bead rings, superposed upon the central portion thereof in the side wall and crown portions of the tire and terminating short of the center plane of the tire to provide a gap between its edges, a narrow gap being provided between the edges of the innermost band and the width of the gap between band edges being increased outwardly of said innermost band, and a series of cord fabric breaker bands interspersed between layers of carcass fabric and bridging said gaps, the innermost of said breaker bands extending substantially the full width of said crown portion and the breaker bands outwardly of said innermost breaker band being progressively narrower.

8. A pneumatic tire according to claim 7 in which the width of the tire is substantially greater than its radial height and the transverse curvature of its crown portion substantially less than that of the side wall portions and in which the breaker plies have their parallel cords disposed at small angles to the center plane of the tire to resist circumferential stretching of the crown portion of the tire.

9. A pneumatic tire having bead, side wall and crown portions reinforced with superposed carcass bands of cord fabric, each bead portion having laterally spaced inextensible bead rings, the transverse curvature of said crown portion being substantially less than that of the side wall portions, the innermost carcass band having parallel cords extending from bead to bead and edge portions folded back over the innermost bead rings, superposed upon the central portion thereof in the side walls and crown portion of the tire and terminating short of the center plane of the tire to provide a narrow gap between its edges, a second cord fabric carcass band surrounding said innermost band that is of a width slightly less than that of the innermost band, that has its edge portions folded back over bead rings disposed outwardly of said innermost rings, superposed upon its central portion in said side wall and crown portions with its edges spaced apart to provide a gap wider than the gap between the edges of the innermost carcass band, cord fabric breaker strips underlying and overlying the edges of said innermost carcass band and additional breaker strips underlying and overlying said second carcass band, said breaker bands having parallel cords disposed at an angle of from 5° to 20° to the center plane of the tire to resist circumferential stretching of the crown portion, the innermost of said breaker bands extending across substantially the full width of said crown portion of the tire and the breaker bands outwardly of said innermost breaker band being progressively narrower, all of said breaker bands bridging the gaps between the edges of said carcass bands.

10. A pneumatic tire according to claim 9 in which layers of rubber fill the gaps between the edges of said carcass bands.

11. A pneumatic tire according to claim 9 in which each carcass band is composed of a plurality of plies of cord fabric.

12. A pneumatic tire according to claim 9 in which the carcass bands are each composed of two plies of cord fabric superposed with the edges of one offset with respect to the edges of the other.

13. A pneumatic tire according to claim 9 that has an outer covering of rubber which includes a transversely convex tread portion.

14. A pneumatic tire according to claim 1 in which the cords of the carcass band extend at an angle of from 35° to 50° to the median plane of the tire and the cords of the breaker band at an angle of from 5° to 20° to the center plane of the tire.

References Cited in the file of this patent

UNITED STATES PATENTS

| 1,769,694 | Jenkinson | July 1, 1930 |
| 2,020,190 | Jones | Nov. 5, 1935 |
| 2,703,128 | Darrow | Mar. 1, 1955 |

FOREIGN PATENTS

| 628,060 | Great Britain | Aug. 22, 1949 |
| (U.S. corresponding Patent 2,493,614, Jan. 3, 1950.) | | |
| 1,187,693 | France | Mar. 9, 1959 |